June 19, 1956  M. O. JOHNSTON  2,751,020
VALVE FOR USE WITH SIDE WALL TESTING APPARATUS
Filed April 19, 1954  4 Sheets-Sheet 2

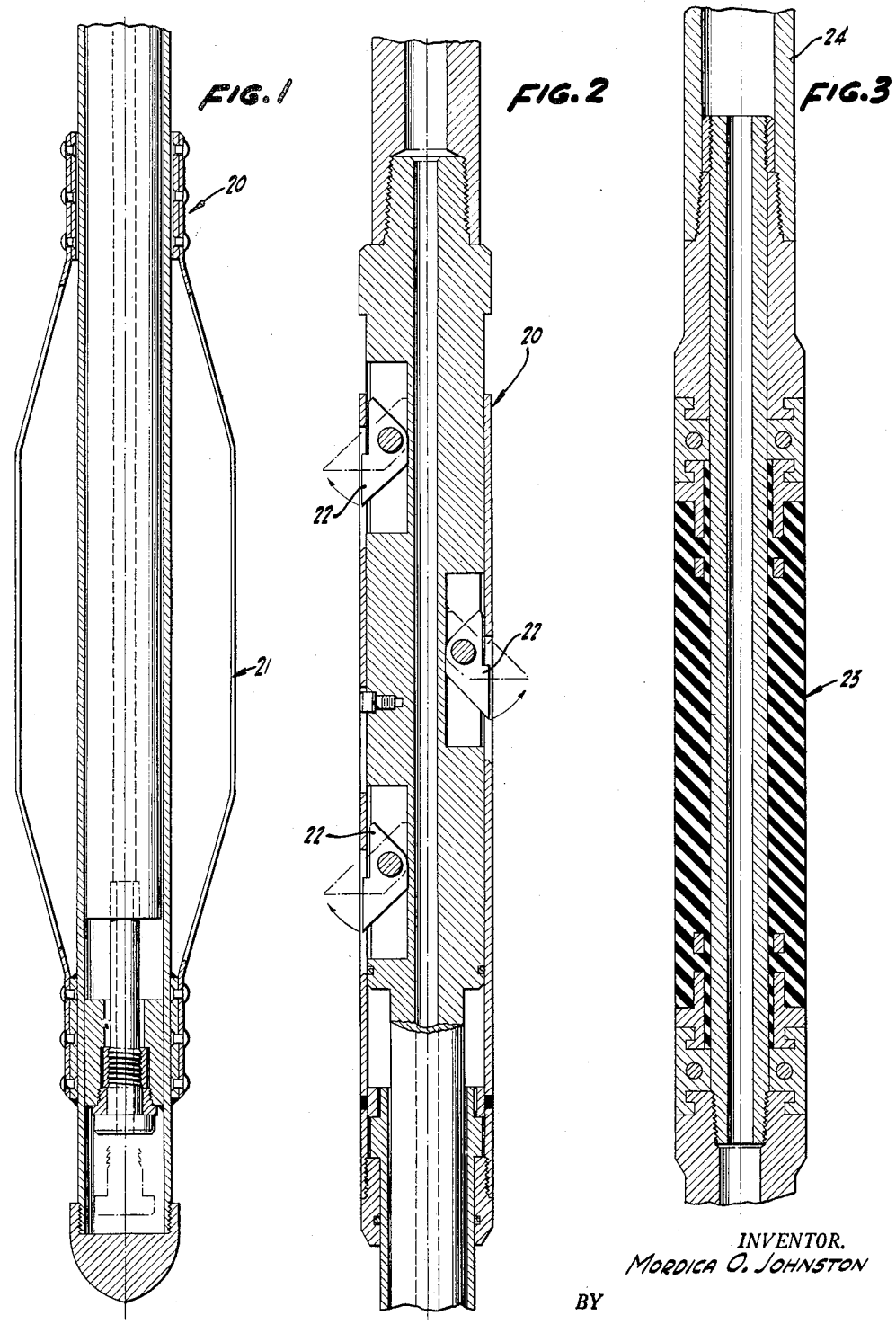

INVENTOR.
MORDICA O. JOHNSTON
BY
Mellin and Hanscom
ATTORNEYS

June 19, 1956     M. O. JOHNSTON     2,751,020
VALVE FOR USE WITH SIDE WALL TESTING APPARATUS
Filed April 19, 1954                           4 Sheets-Sheet 3

INVENTOR.
MORDICA O. JOHNSTON
BY
Mellin and Hanscom
ATTORNEYS

June 19, 1956 M. O. JOHNSTON 2,751,020
VALVE FOR USE WITH SIDE WALL TESTING APPARATUS
Filed April 19, 1954 4 Sheets-Sheet 4
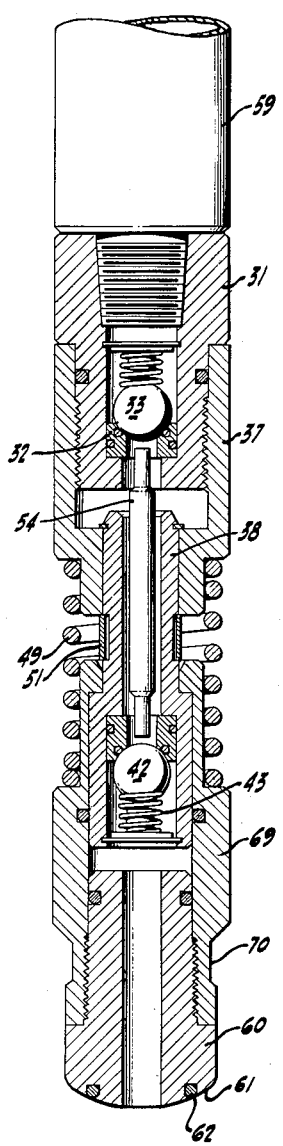
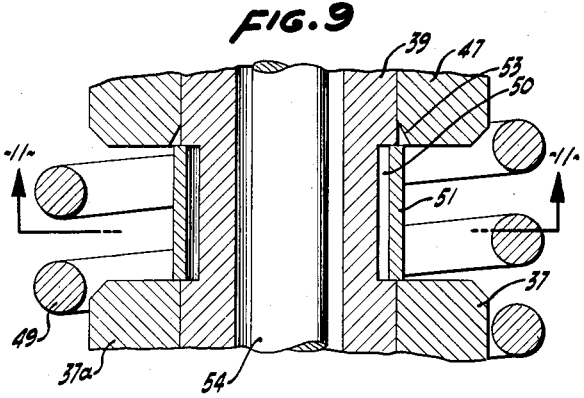
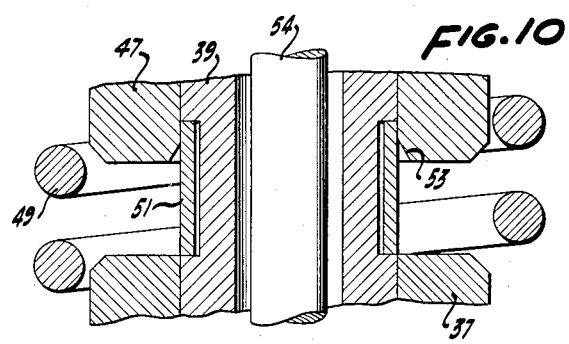
INVENTOR.
MORDICA O. JOHNSTON
BY
Mellin and Hanscom
ATTORNEYS

United States Patent Office 2,751,020
Patented June 19, 1956

2,751,020

VALVE FOR USE WITH SIDE WALL TESTING APPARATUS

Mordica O. Johnston, Glendale, Calif., assignor of one-fourth to Madge Johnston, one-twelfth to Edgar C. Johnston, Jr., one-twelfth to Gordon C. Johnston, and one-twelfth to Joseph Glenn Johnston, all of Longview, Tex., one-eighth to Mordica O. Johnston, Jr., La Jolla, and one-eighth to Warren C. Johnston, Glendale, Calif.

Application April 19, 1954, Serial No. 424,089

10 Claims. (Cl. 166—219)

This invention relates to a side wall testing tool such as disclosed in my copending application entitled "Side Wall Testing Tool," filed February 12, 1954, and bearing Serial No. 409,878, and more particularly to a valve assembly for use in the tool to cut off the flow of fluid through the tool.

In testing producing formations, and particularly those under high pressure, it is extremely important that there be some way to cut off the flow of fluid through the test tool except when the pressure bailer is in connection therewith. It is also important to keep any well fluid or mud which is in the tubing string supporting the testing tool from entering therein and contaminating the test fluid.

The principal object of this invention is to provide a novel form of valve assembly to prevent either the escape of test fluid from or the entry of contaminating fluids into a testing tool.

Another object of this invention is to provide a telescopic valve assembly comprising two oppositely disposed check valves for preventing fluid flow therethrough in either direction, and wherein said valves may be unseated by telescopic action of the valve assembly.

A further object of this invention is to provide a side wall testing apparatus having a valve assembly as set forth in either of the preceding objects in combination with a pressure bailer having a duplicate valve assembly closing its lower end.

A still further object of this invention is to provide a combination side wall testing tool and bailer assembly as set forth in the preceding object wherein means are provided to lock the bailer to the testing apparatus prior to the opening of the valves.

One form which the invention may assume is exemplified in the following description and illustrated by way of example in the accompanying drawings, in which:

Figures 1 through 5 taken together form a composite sectional view through a testing tool embodying the principles of my invention, Fig. 1 showing the lowermost portion of the tool, Fig. 2 showing the next higher portion, etc., with Fig. 5 showing the topmost portion of the tool.

Fig. 8 is a sectional view, taken on line 8—8 of Fig. 5, showing the valve assembly connected to the lower end of the pressure bailer.

Fig. 9 is a sectional view in an enlarged scale, taken on line 9—9 of Fig. 6, showing the details of the spring latch mechanism controlling the action of the valves.

Fig. 10 is a similar view to Fig. 9, showing the spring latch mechanism with the valve housing partially telescoped.

Fig. 11 is a sectional view through the spring latch assembly taken on line 11—11 of Fig. 9.

Figure 4:
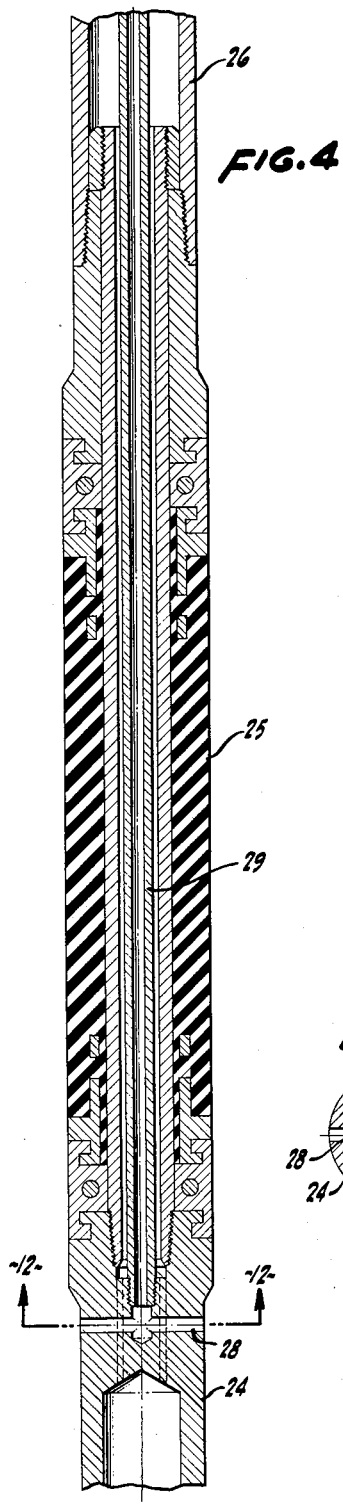
Figure 5:
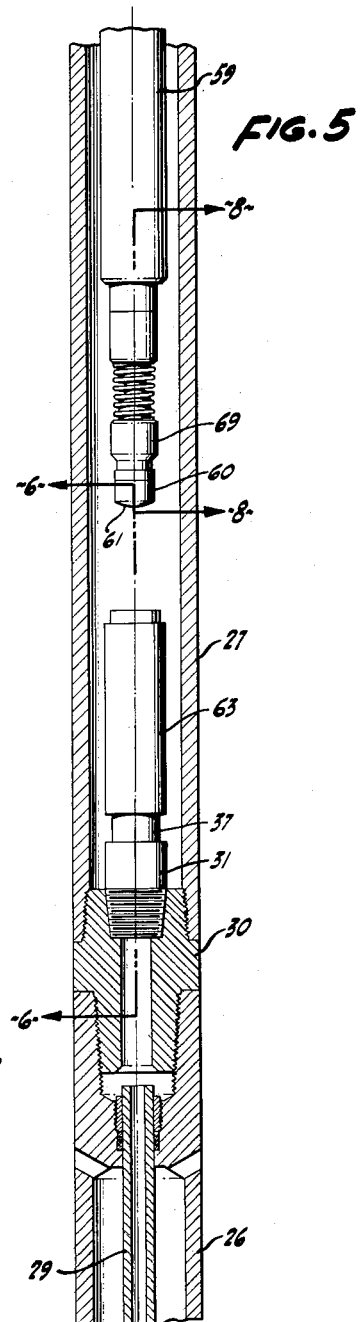
Figure 12:
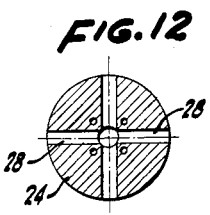
Fig. 12 is a sectional view showing the details of the testing sub assembly, the section being taken on line 12—12 of Fig. 4.

Referring now to the drawings, wherein similar reference numerals are used to designate the same elements throughout the various views, and referring particularly to Figs. 1 through 5 thereof, there is disclosed a testing apparatus comprising an anchor assembly, generally indicated at 20, having a bow spring operated latch 21 designed to actuate a plurality of wall engaging dogs 22 to grip the wall of the well bore. A lower packer member 23 is connected to the upper end of the anchor assembly and a test sub 24 is fastened to the upper end of the packer assembly 23. A second packer assembly 25 is fastened to the upper end of the test sub 24 and is in turn fastened to a sub 26 which is connected to the lower end of a well string 27.

The particular details of the testing apparatus are conventional and form no part of the instant invention. It will suffice to say that when the apparatus is set within the well bore and the packers 23 and 25 are expanded into contact with the walls thereof, the test zone is isolated from the remainder of the well bore, and fluid from said test zone is permitted to pass through ports 28 provided in the test sub 24 in a manner well known in the art. The test ports connect with a longitudinal passage in a tubular element 29 which passes upwardly through the upper packer 25 and connects at its upper end to the valve mounting sub 30 interposed between the sub 26 and the well tubing 27.

Figure 6:
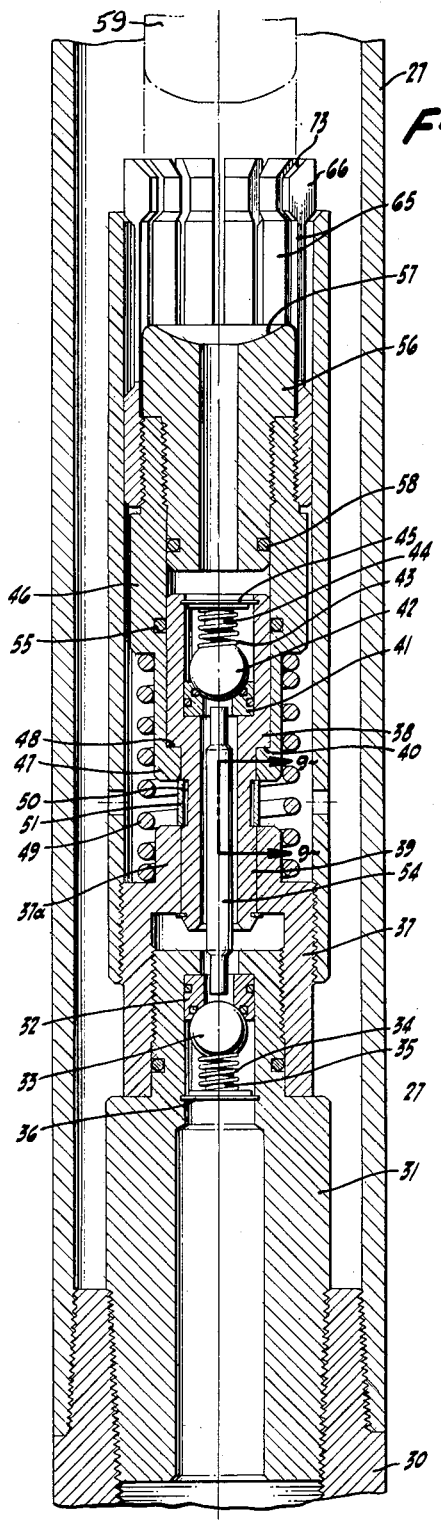
Fig. 6 is a sectional view taken on line 6—6 of Fig. 5, showing the valve assembly per se.

The lower valve housing 31 is threaded into the upper end of the sub 30 and as shown in Fig. 6 contains therein in a downwardly facing spherical valve seat 32 cooperating with a ball valve 33. A valve spring 34 urges the ball 33 upwardly against the seat 32, the lower end of the spring 34 abutting against a retaining and stop member 35 held in place by a snap ring 36. A collar 37 having a reduced diameter upper end portion 37a is threaded onto the upper end of the valve housing 31. An upper valve housing 38 has a reduced diameter lower portion 39 received in telescopic relation within the reduced diameter portion 37a of the collar 37. The reduced portion 39 of the valve housing 38 provides a step forming a downwardly facing abutment surface 40 on the exterior of the valve housing 38. An upwardly facing spherical valve seat 41 is mounted within the valve housing 38 and cooperates with a ball valve 42. The ball valve 42 is normally urged downwardly by a valve spring 43 which abuts against a retaining and stop member 44 held in place by means of a snap ring 45.

A sleeve 46 surrounds the valve housing 38 and has at its lower end an inwardly turned flange 47 providing an upwardly facing shoulder 48 adapted to abut against the downwardly facing abutment surface 40 on the valve housing. The lower end of the flange 47 is spaced from the upper end of the collar 37 when the valve housings are in their extended relation. An annular groove 50 is formed in the exterior surface of the reduced portion 39 of the valve housing 38 in the space between the lower end of the flange 47 and the upper end of the collar 37. A spring steel split ring 51 is contained in the groove 50, the exterior diameter of the ring 51, when in relaxed position, being slightly greater than the exterior diameter housing portion 39, whereby said ring prevents telescopic movement of said housing 38 within the housing 37. The lower end of the flange 47 (see Fig. 9) is provided with a chamfer 53 adjacent its inner end, said chamfer being adapted to cooperate with the split ring 51 whereby, when said sleeve 46 is forced downwardly relative to the housing 38, the chamfer will act to compress the ring 51, thereby making the external diameter thereof the same as the external diameter of the valve housing portion 39 and permit said valve housing portion to move downwardly relative to the collar 37.

A valve actuating rod 54, having an external diameter smaller than the diameter of the passageway through the housing portion 39, is contained in said passageway. The valve actuating rod 54 is slightly shorter in length than the distance between the valve seats 32 and 41 when said valve housings are in extended relation. When said valve housings are telescoped together, the valve actuating rod 54 strikes the balls 33 and 42 and forces the same away from each other and away from their associated valve seats to permit passage of fluid through the valve assembly in the manner illustrated in Fig. 7.

A bailer contacting tubular plug member 56 is threaded into the upper end of the sleeve 46 and is sealed with respect thereto by means of an O-ring seal 58 contained in a groove in the exterior surface of the plug and adapted to contact the inner surface of the sleeve 46. The upper end of the plug 56 is provided with a concave spherical seating surface 57, the purpose of which will become apparent presently.

The valve assembly fastened to the lower end of the bailer 59 is duplicate in all respects with the valve assembly fastened to the upper end of the testing tool, and a detailed description thereof is not deemed necessary other than to state that the valve assembly as applied to the bailer 59 is inverted with respect to the position shown at the top of the tester apparatus. The plug 60 at the lower end of the bailer valve assembly corresponding to the plug 56 in the upper end of the tester valve assembly is provided with a convex spherical seat 61 having an O-ring seal 62 mounted in a groove contained thereon in order to cooperate with and seal against the concave spherical seat 57 on the plug 56 in the manner illustrated in Fig. 7.

Figure 7:
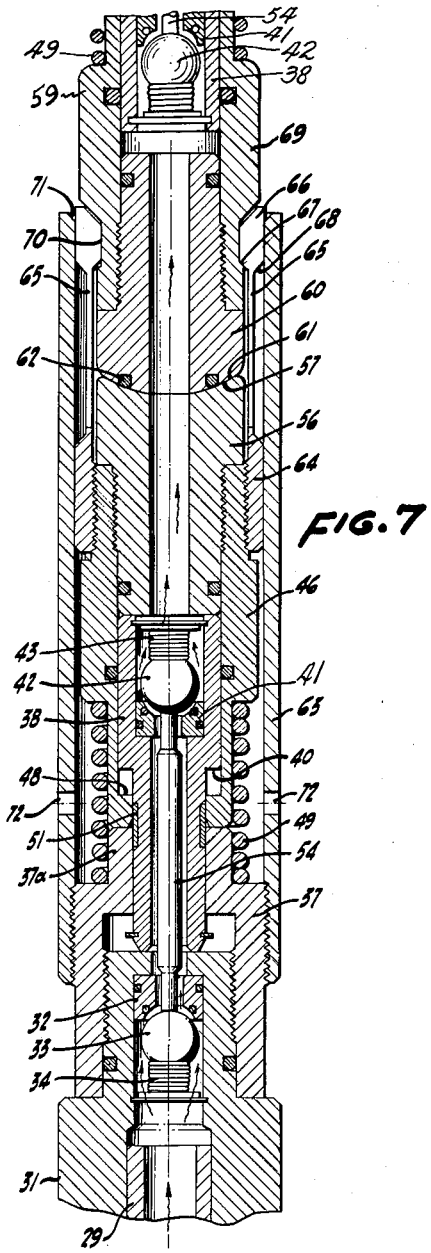
Fig. 7 is a similar view to Fig. 6, showing the valves in their open position.

As best seen in Fig. 7, latch means are provided for holding the two valve assemblies locked together in sealing engagement with each other prior to the actuating of the telescoping valve housings to open the valves contained in the two valve assemblies. Said latch means comprise a latch sleeve 63 threaded to the collar 37 and extending upwardly therefrom. A collar 64 is threaded to the upper end of the sleeve 46 and a plurality of spring fingers 65 extends upwardly from the collar 64. The upper end of each of the spring fingers 65 is provided with an enlarged head 66 which is joined to its associated spring finger by means of two downwardly and inwardly tapering surfaces 67 and 68. The sleeve portion 69 of the bailer valve assembly is provided with a groove 70 spaced upwardly from the lower end thereof, said groove 70 being adapted to receive the inwardly projecting portion of the heads 66 on the spring fingers 65. The upper end of the sleeve 63 is provided with a downwardly and inwardly tapered surface 71 which cooperates with the downwardly and inwardly tapered surface 68 on the lower end of the enlarged head 66 of the spring fingers 65. A plurality of ports 72 is provided in the latch sleeve 63 adjacent the mid-portion of the valve assembly to permit the entry and escape of well fluid as the volume within the sleeve is increased or decreased due to the telescopic action of the valve assembly.

In the operation of the device, the parts are assembled into relationships as shown in Figs. 1 through 5 and the valve assembly in the tester is in the relationship shown in Fig. 6, wherein the valves are shown in the closed position. In this relationship the testing tool is lowered into the well by means of the well tubing 27 and when the proper level to be tested is reached, the anchor mechanism 20 is actuated to cause the dogs 22 to bite into the wall of the well in the manner illustrated in Fig. 2. An additional downward pressure is applied to the tubing 27 to set the packers 23 and 25 and isolate the section of the well bore to be tested. Fluid from the isolated section will enter through the test ports 28 and pass upwardly within the tubular member 29 into the interior passage of the sub 30. The pressure bailer 59 is then lowered within the well tubing 27. When the lower end thereof reaches the members 66 of the latch mechanism the lower end of the bailer contacts the tapered surfaces 73 on the upper end of the heads 66 and forces the heads outwardly to permit the lower end of the bailer valve assembly to pass therethrough. When the heads 66 are forced outwardly, the tapered surfaces 68 cooperate with the tapered surfaces 71 on the latch sleeve to prevent downward movement of the sleeve 46 on the test valve assembly. When the groove 70 on the bailer moves into register with the enlarged head 66 of the spring members 65, the heads are permitted to move into the groove and are forced into said groove by means of the cooperating tapered surfaces 68 on the lower end of said heads and the surface 71 on the upper end of the sleeve 63. The sleeve 46 is then permitted to move downwardly, and the chamfered portion 53 on the lower end thereof compresses the split ring 51 to permit telescopic movement between the housing portion 39 and the upper housing 38 relative to the collar 37. Upon such telescopic movement, the valve actuating rod 54 unseats the double ball valves 33 and 42 to permit fluid to flow upwardly through the test apparatus valve assembly. Similarly, the sleeve 69 on the bailer valve assembly is forced upwardly and causes the double check valves in the bailer valve assembly to be opened and permit fluid to flow into the bailer 59. The bailer is then raised by means of the wire line (not shown) attached thereto. When the bailer is raised, it first causes outward telescopic action of the two valve assemblies to close the valves before the latch mechanism releases to permit disengagement of the bailer from the test apparatus.

While I have described the preferred form of my invention, it is to be understood that various changes may be made therein by those skilled in the art without departing from the spirit of the invention as defined in the appended claims.

Having thus described my invention, what I claim and desire to secure by Letters Patent is:

1. For use with a well testing tool, a valve assembly comprising a first valve housing adapted to be screwed into the flow passage of said testing tool, a tubular collar connected to said first valve housing and extending upwardly therefrom a first downwardly opening check valve in said first valve housing, a second valve housing telescopically connected to said collar, a second upwardly opening check valve in said second housing, a downwardly facing shoulder on said second valve housing, a sleeve surrounding the upper portion of said second valve housing in sliding relation therewith and having an upwardly facing shoulder adapted to abut the downwardly facing shoulder on said housing, the lower surface of said sleeve being normally spaced from the upper surface of said collar, spring means interposed between said collar and said sleeve to urge said valve housings toward their extended relationship, a groove formed in the exterior of said second valve housing between said sleeve and said collar, a spring steel split ring in said groove, said ring when relaxed having an external diameter greater than the external diameter of said housing to prevent telescopic movement of said second valve housing relative to said collar, a chamfer at the lower end of said sleeve, whereby when said sleeve is forced downwardly the chamfer acts to compress said ring to permit telescopic movement of said second valve housing relative to said collar, and a valve operating rod extending through said second housing between said valves and adapted to unseat said valves when said housings are moved together.

2. For use with a well testing tool, a valve assembly comprising a first valve housing adapted to be screwed into the flow passage of said testing tool, a tubular collar connected to said first valve housing and extending upwardly therefrom a first downwardly opening check valve in said first valve housing, a second valve housing telescopically connected to said collar, a second upwardly opening check valve in said second housing, a downwardly facing shoulder on said second valve housing, a sleeve surrounding the upper portion of said second valve housing in sliding relation therewith and having an upwardly facing shoulder adapted to abut the downwardly facing shoulder on said housing, the lower surface of said sleeve being normally spaced from the upper surface of said collar, spring means interposed between said collar and said sleeve to urge said valve housings toward their extended relationship, a groove formed in the exterior of said second valve housing between said sleeve and said collar, a spring steel split ring in said groove, said ring when relaxed having an external diameter greater than the external diameter of said housing, a chamfer at the lower end of said sleeve, whereby when said sleeve is forced downwardly the chamfer acts to compress said ring to permit telescopic movement of said second valve housing relative to said collar, a tubular bailer seating element having a concave upper surface threaded into said sleeve, the lower end of said element being spaced from and adapted to abut the upper end of said second valve housing, and a valve operating rod extending through said second housing between said valves and adapted to unseat said valves when said housings are moved together.

3. For use with a well testing tool, the combination of a first valve assembly comprising a first valve housing adapted to be screwed into the flow passage of said testing tool, a tubular collar connected to said first valve housing and extending upwardly therefrom a downwardly opening check valve in said first valve housing, a second valve housing telescopically connected to said collar, an upwardly opening check valve in said second housing, a valve operating rod extending through said second housing between said valves and adapted to unseat said valves when said second housing is telescoped relative to said collar to move said housings together, a bailer, a second valve assembly fixed to the lower end of said bailer, said second valve assembly being identical to said first valve assembly but inverted with respect thereto, and means for sealing between the upper end of said first valve assembly and the lower end of said second valve assembly when said valve assemblies are brought together in longitudinal alignment with each other.

4. For use with a well testing tool, a combination of a first valve assembly comprising a first valve housing adapted to be screwed into the flow passage of said testing tool, a tubular collar connected to said first valve housing and extending upwardly therefrom a downwardly opening check valve in said first valve housing, a second valve housing telescopically connected to said collar, an upwardly opening check valve in said second housing, a downwardly facing shoulder on said second valve housing, a sleeve surrounding the upper portion of said second valve housing in sliding relation therewith and having an upwardly facing shoulder adapted to abut the downwardly facing shoulder on said housing, the lower surface of said sleeve being normally spaced from the upper surface of said collar, spring means interposed between said collar and said sleeve to urge said valve housings toward their extended relationship, a valve operating rod extending through said second housing between said valves and adapted to unseat said valves when said second housing is telescoped relative to said collar to move said housings together, a bailer, a second valve assembly fixed to the lower end of said bailer, said second valve assembly being identical to said first valve assembly but inverted with respect thereto, and means for sealing between the upper end of said first valve assembly and the lower end of said second valve assembly when said valve assemblies are brought together in longitudinal alignment with each other.

5. For use with a well testing tool, the combination of a first valve assembly comprising a first valve housing adapted to be screwed into the flow passage of said testing tool, a tubular collar connected to said first valve housing and extending upwardly therefrom a downwardly opening check valve in said first valve housing, a second valve housing telescopically connected to said collar, an upwardly opening check valve in said second housing, a downwardly facing shoulder on said second valve housing, a sleeve surrounding the upper portion of said second valve housing in sliding relation therewith and having an upwardly facing shoulder adapted to abut the downwardly facing shoulder on said housing, the lower surface of said sleeve being normally spaced from the upper surface of said collar, spring means interposed between said collar and said sleeve to urge said valve housings toward their extended relationship, a groove formed in the exterior of said second valve housing between said sleeve and said collar, a spring steel split ring in said groove, said ring when relaxed having an external diameter greater than the external diameter of said housing, to prevent telescopic movement of said second valve housing relative to said collar, a chamfer at the lower end of said sleeve, whereby when said sleeve is forced downwardly the chamfer acts to compress said ring to permit telescopic movement of said second valve housing relative to said collar, a valve operating rod extending through said second housing between said valves and adapted to unseat said valves when said housings are moved together, a bailer, a second valve assembly fixed to the lower end of said bailer, said second valve assembly being identical to said first valve assembly but inverted with respect thereto, and means for sealing between the upper end of said first valve assembly and the lower end of said second valve assembly when said valve assemblies are brought together in longitudinal alignment with each other.

6. For use with a well testing tool, a valve assembly comprising a first valve housing adapted to be screwed into the flow passage of said testing tool, a tubular collar connected to said first valve housing and extending upwardly therefrom a downwardly opening check valve in said first valve housing, a second valve housing telescopically connected to said collar, an upwardly opening check valve in said second housing, a downwardly facing shoulder on said second valve housing, a sleeve surrounding the upper portion of said second valve housing in sliding relation therewith and having an upwardly facing shoulder adapted to abut the downwardly facing shoulder on said housing, the lower surface of said sleeve being normally spaced from the upper surface of said collar, spring means interposed between said collar and said sleeve to urge said valve housings toward their extended relationship, a groove formed in the exterior of said second valve housing between said sleeve and said collar, a spring steel split ring in said groove, said ring when relaxed having an external diameter greater than the external diameter of said housing, a chamfer at the lower end of said sleeve, whereby when said sleeve is forced downwardly the chamfer acts to compress said ring to permit telescopic movement of said second valve housing relative to said collar, a tubular bailer seating element having a concave upper surface threaded into said sleeve, the lower end of said element being spaced from and adapted to abut the upper end of said second valve housing, a valve operating rod extending through said second housing between said valves and adapted to unseat said valves when said housings are moved together, a bailer, a second valve assembly fixed to the lower end of said bailer, said second valve assembly comprising the same elements as said first valve assembly, said second valve assembly being inverted with respect to said first valve assembly, the seat on the bailer seating element thereof being convex to seat against the concave surface on the corresponding element of said first valve assembly when said valve assemblies are brought together in longitudinal alignment with each other.

7. For use with a well testing tool, the combination of a first valve assembly comprising a first valve housing adapted to be screwed into the flow passage of said testing tool, a tubular collar connected to said first valve housing and extending upwardly therefrom a downwardly opening check valve in said first valve housing, a second valve housing telescopically connected to said collar, an upwardly opening check valve in said second housing, a valve operating rod extending through said second housing between said valves and adapted to unseat said valves when said second housing is telescoped relative to said collar to move said housings together, a bailer, a second valve assembly fixed to the lower end of said bailer, said second valve assembly being identical to said first valve assembly but inverted with respect thereto, and means for sealing between the upper end of said first valve assembly and the lower end of said second valve assembly when said valve assemblies are brought together in longitudinal alignment with each other, and releasable latch means for locking said valve assemblies together when said valve assemblies are in telescoped relation to open said valves.

8. For use with a well testing tool, the combination of a first valve assembly comprising a first valve housing adapted to be screwed into the flow passage of said testing tool, a tubular collar connected to said first valve housing and extending upwardly therefrom a downwardly opening check valve in said first valve housing, a second valve housing telescopically connected to said collar, an upwardly opening check valve in said second housing, a downwardly facing shoulder on said second valve housing, a sleeve surrounding the upper portion of said second valve housing in sliding relation therewith and having an upwardly facing shoulder adapted to abut the downwardly facing shoulder on said housing, the lower surface of said sleeve being normally spaced from the upper surface of said collar, spring means interposed between said collar and said sleeve to urge said valve housings toward their extended relationship, a valve operating rod extending through said second housing between said valves and adapted to unseat said valves when said second housing is telescoped relative to said collar to move said housings together, a bailer, a second valve assembly fixed to the lower end of said bailer, said second valve assembly being identical to said first valve assembly but inverted with respect thereto, means for sealing between the upper end of said first valve assembly and the lower end of said second valve assembly when said valve assemblies are brought together in longitudinal alignment with each other, and releasable latch means for locking said valve assemblies together when said valve assemblies are in telescoped relation to open said valves.

9. For use with a well testing tool, the combination of a first valve assembly comprising a first valve housing adapted to be screwed into the flow passage of said testing tool, a tubular collar connected to said first valve housing and extending upwardly therefrom a downwardly opening check valve in said first valve housing, a second valve housing telescopically connected to said collar, an upwardly opening check valve in said second housing, a downwardly facing shoulder on said second valve housing, a sleeve surrounding the upper portion of said second valve housing in sliding relation therewith and having an upwardly facing shoulder adapted to abut the downwardly facing shoulder on said housing, the lower surface of said sleeve being normally spaced from the upper surface of said collar, spring means interposed between said collar and said sleeve to urge said valve housings toward their extended relationship, a groove formed in the exterior of said second valve housing between said sleeve and said collar, a spring steel split ring in said groove, said ring when relaxed having an external diameter greater than the external diameter of said housing to prevent telescopic movement of said second valve housing relative to said collar, a chamfer at the lower end of said sleeve, whereby when said sleeve is forced downwardly the chamfer acts to compress said ring to permit telescopic movement of said second valve housing relative to said collar, a valve operating rod extending through said second housing between said valves and adapted to unseat said valves when said housings are moved together, a bailer, a second valve assembly fixed to the lower end of said bailer, said second valve assembly being identical to said first valve assembly but inverted with respect thereto, means for sealing between the upper end of said first valve assembly and the lower end of said second valve assembly when said valve assemblies are brought together in longitudinal alignment with each other, and releasable latch means for locking said valve assemblies together when said valve assemblies are in telescoped relation to open said valves.

10. For use with a well testing tool, a valve assembly comprising a first valve housing adapted to be screwed into the flow passage of said testing tool, a tubular collar connected to said first valve housing and extending upwardly therefrom a downwardly opening check valve in said first valve housing, a second valve housing telescopically connected to said collar, an upwardly opening check valve in said second housing, a downwardly facing shoulder on said second valve housing, a sleeve surrounding the upper portion of said second valve housing in sliding relation therewith and having an upwardly facing shoulder adapted to abut the downwardly facing shoulder on said housing, the lower surface of said sleeve being normally spaced from the upper surface of said collar, spring means interposed between said collar and said sleeve to urge said valve housings toward their extended relationship, a groove formed in the exterior of said second valve housing between said sleeve and said collar, a spring steel split ring in said groove, said ring when relaxed having an external diameter greater than the external diameter of said housing, a chamfer at the lower end of said sleeve, whereby when said sleeve is forced downwardly the chamfer acts to compress said ring to permit telescopic movement of said second valve housing relative to said collar, a tubular bailer seating element having a concave upper surface threaded into said sleeve, the lower end of said element being spaced from and adapted to abut the upper end of said second valve housing, a valve operating rod extending through said second housing between said valves and adapted to unseat said valves when said second housing is telescoped relative to said collar to move said housings together, a bailer, a second valve assembly fixed to the lower end of said bailer, said second valve assembly comprising the same elements as said first valve assembly, said second valve assembly being inverted with respect to said first valve assembly, the seat on the bailer seating element thereof being convex to seat against the concave surface on the corresponding element of said first valve assembly when said valve assemblies are brought together in longitudinal alignment with each other, and releasable latch means for locking said valve assemblies together when said valve assemblies are in telescoped relation to open said valves.

References Cited in the file of this patent

UNITED STATES PATENTS

| | | |
|---|---|---|
| 1,844,979 | Rohe et al. | Feb. 16, 1932 |
| 2,518,299 | Fernandez | Aug. 8, 1950 |